Nov. 28, 1967      P. C. KEMPE      3,355,264
COMPOSITE IMPACT AND ABRASION RESISTANT MATERIAL
Filed Feb. 3, 1965
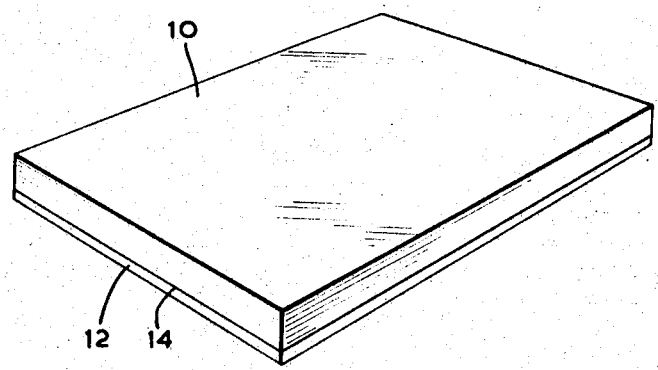
INVENTOR.
PHILIP C. KEMPE
BY Featherstonhaugh & Co.
ATTORNEYS

United States Patent Office 3,355,264
Patented Nov. 28, 1967

3,355,264
COMPOSITE IMPACT AND ABRASION RESISTANT MATERIAL
Philip C. Kempe, Toronto, Ontario, Canada, assignor to Canada Iron Foundries Limited, Montreal, Quebec, Canada
Filed Feb. 3, 1965, Ser. No. 430,078
1 Claim. (Cl. 29—183.5)

ABSTRACT OF THE DISCLOSURE

An impact and abrasion resistant article formed by joining a relatively thick cast abrasion resistant layer to a relatively thin, ductile, machinable and weldable ferrous backing by an intermediate continuous bonding layer.

---

This invention relates to the manufacture of impact and abrasion resistant materials such as those used in machinery operating in abrasive environments or in machinery particularly designed for crushing and grinding operations.

A material which is to have high abrasion resistant qualities must be hard and it is known to use hard brittle materials in those parts of machinery which are subjected to abrasive forces. For example, it is known to use brittle metal liners in ball mills and other grinding machinery. Similarly, abrasion resistant alloys are used for lining or covering machine parts operating in an abrasive environment. For example, the blades of fans employed in certain dry grinding circuits in the mineral industry are commonly subjected to the abrasive action of small particles moving at high velocity.

While the use of hard wear resistant parts in the type of machinery mentioned above does increase the life of these parts, it has been found that there are problems associated with their use. First of all, the extreme hardness of the material renders it quite brittle and subject to fracture under dynamic loading particularly if fine hairline cracks or other surface defects are present in the casting which may hasten failure. Secondly, the brittleness of the material creates difficulties in fixing the material to the machine parts to be protected. For instance, very hard brittle materials cannot usually be welded satisfactorily so that welding the material on the parts to be protected is not practical.

Heretofore, it has been common to attempt to overcome the above noted difficulties in using brittle materials by (a) designing the brittle parts so that they possess enough inherent strength to withstand the loads expected in service, or (b) providing the brittle parts with rigid enough support to prevent excessive deflection under load. However, there are many occasions when neither of the aforementioned solutions are satisfactory. For example, certain pulverizing machines employ rotors which essentially consist of a large number of blades through which the material to be pulverized is passed as the blades are rotated at high speed. The blades are subjected to abrasive forces and it is desirable that they be comprised of an abrasive resistant material. It is also desirable that the blades be as light as possible in order that the centrifugal forces acting on the rotor be kept at a minimum. Thus, it is not a desirable solution to manufacture the blades entirely of a brittle material as they would have to be made too heavy, resulting in uneconomically high rotor construction cost. Even if it were economically feasible, there still exists the possibility of catastrophic failure of such parts due to aforementioned defects. Similarly, supporting the blades with rigid elements as to prevent excessive deflection is also not practical for the same reason. Bolting brittle material blades to the rotor arms is not satisfactory because it has been found that fracture of the brittle material can still occur between the bolting points so that it is not unknown to have fragments of the brittle material break away between the bolts, thus endangering the machinery involved due to the possible effect of the loose particles of the brittle material on the moving parts of the machinery. Further, in the case of the rotor type of pulverizer mentioned above, the separation of brittle material from the blades can seriously upset the overall balance of the rotor, and the loss of even very small particles of the brittle material can cause costly shutdowns. Even where it is permissible to fasten a brittle wear resistant part by bolting it in place, only a portion of the casting can be utilised since it must be considered worn out when the head of the bolt itself has worn away.

Another frequently used method for holding brittle liner castings in place is by means of small steel plates cast into the back of the liner plate to which it is possible to weld threaded studs or other fastenings. While this method permits greater utilisation of the liner casting, it still does not overcome the problem of breakage between such fastening points.

Thus this invention represents a major advance in the technology of brittle wear resistant materials since it has been difficult, in fact virtually impossible, for the trade to avail itself of the desirable qualities of these materials in applications where the consequences of failure are serious.

It is, therefore, an object of this invention to provide a composite impact and abrasion resistant material which includes a ductile backup metal and a hard brittle facing metal which are joined together in a manner designed to avoid the above noted difficulties encountered with conventional methods of fastening brittle materials.

The above and further objects of the invention are achieved by a composite impact and abrasion resistant material comprising a cast component of a martensitic-austenitic matrix containing finely dispersed carbides compatible with the matrix material, said carbides being selected from the group consisting of the carbides of iron, chromium, molybdenum, tungsten, vanadium and titanium; a second component of a ductile, machinable and weldable ferrous material, said second component being fixed to said first component by means of an intermediate continuous layer of a material adapted to form a metallurgical bond with each of said first and second components.

The invention will be more thoroughly understood from the following description of a preferred embodiment thereof as read in conjunction with the accompanying drawing.

In the drawing,

FIGURE 1 is a perspective view of a composite material in accord with this preferred embodiment of the invention.

Referring to the drawing, the material of the invention is comprised of a first component 10 of a highly abrasive resistant alloy and a second component 12 of a relatively ductile machinable and weldable ferrous material with the two main components being joined by a continuous layer 14 of a third material adapted to form a metallurgical bond with each of the components 12 and 14. Joining might be carried out, by way of example, by known vacuum brazing techniques employing a copper alloy. It is essential that the joining layer be continuous as it is one of the prime objects of the invention to prevent fragments of the brittle wear resisting first component from falling away from the backing component 12.

The abrasive resistant component 10 is cast to the shape desired and is comprised of a martensitic-austenitic matrix containing dispersed carbides which are compatible with the matrix material. Many suitable such materials are known per se and the common carbides employed are those of chromium, molybdenum, tungsten, vanadium and titanium. A material of this type does, of course, have the desired high abrasion resistant quality but is also subject to impact fracture due to its extreme hardness and for this reason, it has been difficult, prior to this invention, for the trade to avail itself of the desirable qualities of the material. Another difficulty in using highly abrasion resistant materials has been related to the problem of fixing the materials in place. Since such materials are virtually incapable of being machined in the hardened condition and only with difficulty when annealed, it has not been economically feasible, for example, to hold components in place by threading apertures for the reception of screws. Further, as these materials cannot be welded, the possibility of holding them in place by welding has also not been practical. This difficulty is also overcome by the composite material of this invention as the second component is machinable and weldable. Preferably the second component has a thickness not less than 22 Manufacturers' Standard Gauge (M.G.G.) or equivalent as it is found that where the backing layer is less than this thickness, it is difficult to utilize the backing for holding the composite material in place. For related and other reasons, it has also been found that the ratio of the thickness of the brittle material to the thickness of the backing material is preferably at least 3 to 1 and does not exceed 15 to 1.

As previously mentioned, it is essential that the intermediate joining layer be continuous, while its thickness in actual practice is of the order of a few thousandths of an inch.

As suggested above, a preferred method of effecting placement of the joining layer is by vacuum brazing. It has been found that as a subsidiary advantage of this method, heat treatment of the brittle component in order to produce maximum abrasion resistance is effected automatically during the brazing process. Thus, two manufacturing steps are combined in one with a resultant saving in manufacturing costs.

What I claim as my invention is:

A composite impact and abrasive resistant plate comprising a wear resistant, brittle cast alloy component of a martensitic-austenitic matrix containing finely dispersed carbides compatible with the matrix material, said carbides being selected from the group consisting of the carbides of iron, chrominum, molybdenum, tungsten, vanadium and titanium; a second component of a ductile, machinable and weldable ferrous material being of such thickness that the ratio of the thickness of the first component to the thickness of the second component is between and including 3 to 1 and 15 to 1, said second component being fixed to said first component by means of an intermediate continuous layer of a vacuum brazed copper alloy adapted to form a metallurgical bond with each of said first and second components.

References Cited

UNITED STATES PATENTS

| | | | |
|---|---|---|---|
| 1,939,768 | 12/1933 | De Bats | 29—195 |
| 2,414,231 | 1/1947 | Kraus | 29—195 |
| 2,439,570 | 4/1948 | Hensel | 29—182.7 |
| 3,053,706 | 9/1962 | Gregory | 29—182.7 |
| 3,160,480 | 12/1964 | Alliegro | 29—195 |

FOREIGN PATENTS 540,270  6/1940  Great Britain.

HYLAND BIZOT, *Primary Examiner.*